United States Patent
Okamura

(10) Patent No.: US 9,390,316 B2
(45) Date of Patent: Jul. 12, 2016

(54) IMAGE SELECTING DEVICE, IMAGE SELECTING METHOD, IMAGE PICKUP APPARATUS, AND COMPUTER-READABLE MEDIUM

(75) Inventor: Koki Okamura, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 1428 days.

(21) Appl. No.: 12/047,493

(22) Filed: Mar. 13, 2008

(65) Prior Publication Data

US 2008/0226140 A1 Sep. 18, 2008

(30) Foreign Application Priority Data

Mar. 16, 2007 (JP) ................ P2007-068135

(51) Int. Cl.
*G06K 9/00* (2006.01)
*H04N 5/232* (2006.01)

(52) U.S. Cl.
CPC ........ *G06K 9/00221* (2013.01); *G06K 9/00288* (2013.01); *G06K 9/00677* (2013.01); *H04N 5/23219* (2013.01)

(58) Field of Classification Search
CPC .................. G06K 9/00288; G06K 9/00221
USPC ........................................................ 382/118
See application file for complete search history.

(56) References Cited

U.S. PATENT DOCUMENTS

| | | | | |
|---|---|---|---|---|
| 6,819,783 B2 * | 11/2004 | Goldberg et al. | ............. | 382/115 |
| 7,203,367 B2 * | 4/2007 | Shniberg et al. | ............. | 382/224 |
| 7,423,669 B2 * | 9/2008 | Oya et al. | ................. | 348/208.14 |
| 7,519,200 B2 * | 4/2009 | Gokturk et al. | ............... | 382/118 |
| 7,558,408 B1 * | 7/2009 | Steinberg | ........... | G06K 9/00677 340/5.53 |
| 7,564,994 B1 * | 7/2009 | Steinberg et al. | ............. | 382/118 |
| 7,711,145 B2 * | 5/2010 | Gallagher | .................... | 382/103 |
| 7,716,157 B1 * | 5/2010 | Bourdev et al. | | |
| 7,783,084 B2 * | 8/2010 | Imagawa et al. | ............. | 382/118 |
| 7,783,085 B2 * | 8/2010 | Perlmutter | ........ | G06F 17/30256 382/118 |
| 7,835,550 B2 * | 11/2010 | Tamaru | ........................ | 382/118 |
| 7,978,936 B1 * | 7/2011 | Casillas et al. | ................ | 382/305 |
| 8,044,945 B2 * | 10/2011 | Takamori | .......... | G06F 17/30256 345/204 |

(Continued)

FOREIGN PATENT DOCUMENTS

| | | |
|---|---|---|
| JP | 2003-150932 | 5/2003 |
| JP | 2005-174308 A | 6/2005 |

(Continued)

OTHER PUBLICATIONS

Cui et al., EasyAlbum: An Interactive Photo Annotation System Based on Face Clustering and Re-ranking, Apr. 28-May 3, 2007 [retrieved Feb. 11, 2016], Proceedings of the SIGCHI Conference on Human Factors in Computing Systems,pp. 367-376. Retrieved from the Internet:http://dl.acm.org/citation.cfm?id=1240684.*

(Continued)

*Primary Examiner* — Matthew Bella
*Assistant Examiner* — Dennis Rosario
(74) *Attorney, Agent, or Firm* — Birch, Stewart, Kolasch & Birch, LLP

(57) ABSTRACT

An image extracting unit and an album setting unit are provided. The image extracting unit sets a predetermined image of a plurality of images as a group photograph and extracts, from the plurality of images, images including each of face images of the group photograph. The album setting unit records image identification information of the extracted images in a predetermined file.

21 Claims, 8 Drawing Sheets

(56) References Cited

U.S. PATENT DOCUMENTS

| | | | |
|---|---|---|---|
| 8,385,606 B2* | 2/2013 | Fukuda et al. | 382/118 |
| 2005/0105806 A1 | 5/2005 | Nagaoka et al. | |
| 2005/0147302 A1 | 7/2005 | Leung | |
| 2006/0274978 A1* | 12/2006 | Fukuda et al. | 382/305 |
| 2007/0065044 A1* | 3/2007 | Park et al. | 382/305 |
| 2007/0195995 A1* | 8/2007 | Matsumoto et al. | 382/103 |
| 2008/0118156 A1 | 5/2008 | Okada | |

FOREIGN PATENT DOCUMENTS

| | | |
|---|---|---|
| JP | 2005-202660 A | 7/2005 |
| JP | 2005-210369 A | 8/2005 |
| JP | 2005-234779 | 9/2005 |
| JP | 2005-267146 A | 9/2005 |
| JP | 2005-303754 A | 10/2005 |
| JP | 2006-92026 A | 4/2006 |
| JP | 2006-165822 | 6/2006 |
| JP | 2006-172090 A | 6/2006 |
| JP | 2006-189977 | 7/2006 |
| JP | 2006-314010 | 11/2006 |
| JP | 2008-11145 | 1/2008 |
| JP | 2008-21324 A | 1/2008 |
| JP | 2008-131405 A | 6/2008 |

OTHER PUBLICATIONS

Vellespi et al., Automatic Clustering of Faces in Meetings, Oct. 8-11, 2006 [retrieved Feb. 11, 2016], 2006 IEEE International Conference on Image Processing, pp. 1841-1844. Retrieved from the Internet: http://ieeexplore.ieee.org/xpls/abs_all.jsp?arnumber=4106911&tag=1.*

Japanese Office Action—Notification of Reason for Refusal; Aug. 3, 2010.

Chinese Office Action; State Intellectual Property Office of P.R.C., Feb. 12, 2010.

* cited by examiner

FIG. 4

```
[index]
Image =DSCF0001. JPG      // GROUP PHOTOGRAPH FILE NAME
FaceNumber=8              // THE NUMBER OF INCLUDED FACE IMAGE(S)

[Face_01]
Coordinate=68,25,126,102  // FACE COORDINATE (UPPER LEFT, LOWER RIGHT)
ImageNumber=2             // THE NUMBER OF ASSOCIATED IMAGE(S)
Image_0001=20060801¥DSCF0003.JPG
                          // FILE PATH OF ASSOCIATED IMAGE(S)
Image_0002=20060801¥DSCF0008.JPG

[Face_02]
    :
```

FIG. 8
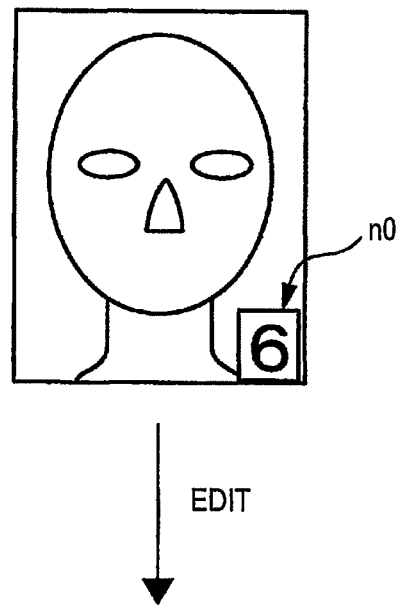
EDIT
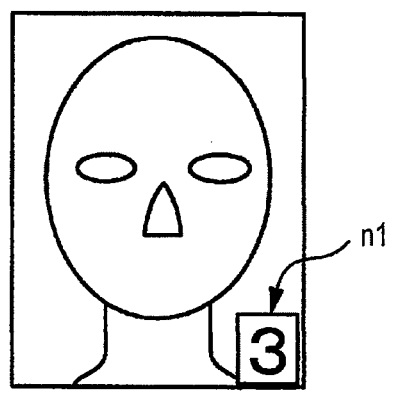

IMAGE SELECTING DEVICE, IMAGE SELECTING METHOD, IMAGE PICKUP APPARATUS, AND COMPUTER-READABLE MEDIUM

CROSS-REFERENCE TO RELATED APPLICATIONS

This application is based upon and claims the benefit of priority from the Japanese Patent Application No. 2007-68135 filed on Mar. 16, 2007, the entire contents of which are incorporated herein by reference.

BACKGROUND OF THE INVENTION

1. Technical Field

The invention relates to an image selecting device, an image selecting method, an image pickup apparatus, and a program that set, based on a face image included in a plurality of images, an album in which images showing a person of the face image are collected.

2. Description of the Related Art

There is a technique of extracting a face image of a person included in an image captured by a digital camera or the like. Documents described below have proposed various techniques using the extracted face image.

JP 2005-267146 A describes using a group photograph as an index; when a subject is selected from the group photograph, searching an existing memory for an image corresponding to the subject; and automatically creating an e-mail based on a mail address associated with the found subject image.

JP 2005-202660 A describes a search system that reads a predetermined person's face from a group photograph, reads out personal information corresponding to face data from a recording portion, and displaying the personal information. The group photograph is used as a search key for the personal information.

JP 2005-303754 A describes extracting images in order from the top of an image group that is determined as including a person image and registering the extracted images as reference images. All images including the same person are extracted from the image group, using face images included in the reference images as a key. Then, the images are stored in folders for respective persons.

JP 2005-174308 A (corresponding to US 2005/0105806 A and US 2005/0147302 A) describe cutting out face images from an image, displaying the face images in a list form as non-classified person-indefinite images. In this case, the images are arranged in descending order of similarity between the face images and a predetermined person image, and the face images are associated with the existing persons by a drag and drop operation of a user, respectively.

JP 2006-92026 A describes: extracting face images from images showing persons, and classifying the face images for each person. Then, the best shot is selected for each person. JP 2006-92026 A describes two kinds of methods as a determination method, that is, a) allowing a user to select one face image from a face image list of the same person, and b) detecting an eye area and selecting one face image where the eyes are not closed.

When a photographer takes a large number of photographs at an event or the like where many people gather and then sends an image to each person of a photographic subject or sends a printed-out photograph to each person, classification or selection of the images is a very troublesome work. In this case, there has been a demand to automatically classify the images into groups suitable for the respective persons and to reduce burden necessary for that work.

JP 2005-267146 A relates to searching for a mail address, but does not describe a method of automatically classifying images into groups suitable for respective persons.

JP 2005-202660 A relates to specifying persons in a face image, but does not describe a method of automatically classifying images into groups suitable for respective persons. Also, it is less necessary for JP 2005-202660 A to use the group photograph as a search key for personal information.

Since JP 2005-303754A uses images as reference images from the top, even if the first image is poorly taken, the first image is set as the reference image. Therefore, it is likely that an erroneous detection is made in searching for the same person image. When plural persons are included in one image, one image is redundantly stored in respective personal folders, which unnecessarily wastes a system resource.

Since JP 2005-174308 A requires a user to classify images by himself (herself), it may be troublesome to classify the images when handling a large number of images.

JP 2006-92026 A relates to selecting a face image of each person and generating a "segmented" template. Also, when the method of allowing the user to select one face image from the face image list of the same person is employed, it may be troublesome to select the face image in handling a large number of images.

SUMMARY OF THE INVENTION

In view of the above circumstances, the invention has been made and provides an image selecting device, an image selecting method, an image pickup apparatus, and a program which are capable of automatically classifying images into groups suitable for respective persons. The invention may also provide a computer-readable medium storing the above program.

(1) According to an aspect of the invention, an image selecting device includes an image extracting unit and an album setting unit. The image extracting unit sets a predetermined image of a plurality of images as a group photograph and extracts, from the plurality of images, images including each of face images of the group photograph. The album setting unit records image identification information of the extracted images in a predetermined file.

(2) The image selecting device of (1) may further include a list display unit. When one of the face images is selected from the group photograph, the list display unit displays a list of images, other than the group photograph, including the selected face image.

(3) The image selecting device of any one of (1) to (2) may further include a number display unit and an edit unit. The number display unit displays a number of images including each face image of the group photograph. The edit unit changes the numbers of images. The image extracting unit may extract the images including each face image up to the corresponding number designated by the edit unit, based on recommendation degrees of the plurality of images.

(4) In the image selecting device of any one of (1) to (3), the image extracting unit may set an image, of the plurality of images, showing the largest number of face images that face front as the group photograph.

(5) In the image selecting device of any one of (1) to (4), the image identification information may include image storage position information that specifies extracted images.

(6) In the image selecting device of (2), when the one of the face images is to be selected from the group photograph, face-image frames each having a rectangular shape surrounding a corresponding face area may be set and each face-image frame may be set based on coordinate information.

(7) According to another aspect of the invention, an image selecting method comprising: setting a predetermined image of a plurality of images as a group photograph; extracts, from the plurality of images, images including each of face images of the group photograph; and recording image identification information of the extracted images in a predetermined file.

(8) The image selecting method of (7) may further include when one of the face images is selected from the group photograph, displaying a list of images, other than the group photograph, including the selected face image.

(9) The image selecting method of any one of (7) to (8) may further include displaying a number of images including each face image of the group photograph; and changing the numbers of images. The extracting may extract the images including each face image up to the corresponding number designated by the changing, based on recommendation degrees of the plurality of images.

(10) In the image selecting method of any one of (7) to (9), the setting may set an image, of the plurality of images, showing the largest number of face images that face front as the group photograph.

(11) In the image selecting method of any one of (7) to (10), the image identification information may include image storage position information that specifies extracted images.

(12) The image selecting method of (8) may further include: when the one of the face images is to be selected from the group photograph, setting face-image frames each having a rectangular shape surrounding a corresponding face area and setting each face-image frame based on coordinate information.

(13) According to further another aspect of the invention, an image pickup apparatus include an image extracting unit and an album setting unit. The image extracting unit sets a predetermined image of a plurality of captured images as a group photograph and extracts, from the plurality of captured images, images including each of face images of the group photograph. The album setting unit records image identification information of the extracted images in a predetermined file.

(14) The image pickup apparatus of (13) may further include a list display unit. When one of the face images is selected from the group photograph, the list display unit displays a list of images, other than the group photograph, including the selected face image.

(15) The image pickup apparatus of any one of (13) to (14) may further include a number display unit and an edit unit. The number display unit displays a number of images including each face image of the group photograph. The edit unit changes the numbers of images. The image extracting unit may extract the images including each face image up to the corresponding number designated by the edit unit, based on recommendation degrees of the plurality of captured images.

(16) In the image pickup apparatus of any one of (13) to (15), the image extracting unit may set an image, of the plurality of captured images, showing the largest number of face images that face front as the group photograph.

(17) In the image pickup apparatus of any one of (13) to (16), the image identification information may include image storage position information that specifies extracted images.

(18) In the image pickup apparatus of (14), when the one of the face images is to be selected from the group photograph, face-image frames each having a rectangular shape surrounding a corresponding face area may be set and each face-image frame may be set based on coordinate information.

(19) According to still another aspect of the invention, a compute-readable medium stores a program that causes a computer to execute image selection. The image selection includes: setting a predetermined image of a plurality of images as a group photograph; extracts, from the plurality of images, images including each of face images of the group photograph; and recording image identification information of the extracted images in a predetermined file.

(20) In the computer-readable medium of (19), the image selection may further include: when one of the face images is selected from the group photograph, displaying a list of images, other than the group photograph, including the selected face image.

(21) In the computer-readable medium of any one of (19) to (20), the image selection may further include displaying a number of images including each face image of the group photograph, and changing the numbers of images. The extracting may extract the images including each face image up to the corresponding number designated by the changing, based on recommendation degrees of the plurality of images.

(22) In the computer-readable medium of any one of (19) to (21) the setting may set an image, of the plurality of images, showing the largest number of face images that face front as the group photograph.

(23) In the computer-readable medium of any one of (19) to (22), the image identification information may include image storage position information that specifies extracted images.

(24) In the computer-readable medium of (20), the image selection may further include: when the one of the face images is to be selected from the group photograph, setting face-image frames each having a rectangular shape surrounding a corresponding face area and setting each face-image frame based on coordinate information.

With the above configuration, a group photograph is extracted from a plurality of captured images, and face images of the group photograph are stored in a file together with image identification information of the other images. Accordingly, when an album for each person who is a photographic subject is created, it is possible to promptly acquire information that associates the person who is the photographic subject and the other images showing the person. Therefore, the user does not need to select images by himself (herself) and it is possible to automatically obtain an index of the album for each image, which is convenient for use.

When one of the face images is selected from the group photograph, a list of images which are other than the group photograph and which include the selected face image is displayed. In this case, the other images are easily browsed at the time of handling images, which is convenient.

The number of images including the face image for each face image of the group photograph is displayed. Also, the number of images is changeable to the predetermined number of images based on recommendation degrees. Therefore, it is possible to reduce burden in selecting images when images are reprinted and distributed.

With the above configuration, it is possible to provide an image selecting device, an image selecting method, an image pickup apparatus, and a program, which are capable of automatically classifying images into groups suitable for respective persons.

BRIEF DESCRIPTION OF THE DRAWINGS

FIG. 4 is a diagram illustrating an example of an album configuration file.

FIG. 8 is a diagram illustrating a state in which the number of images is displayed.

DETAILED DESCRIPTION OF EMBODIMENTS OF THE INVENTION

Hereinafter, embodiments of the invention will be described in detail with reference to the drawings.

Figure 1:
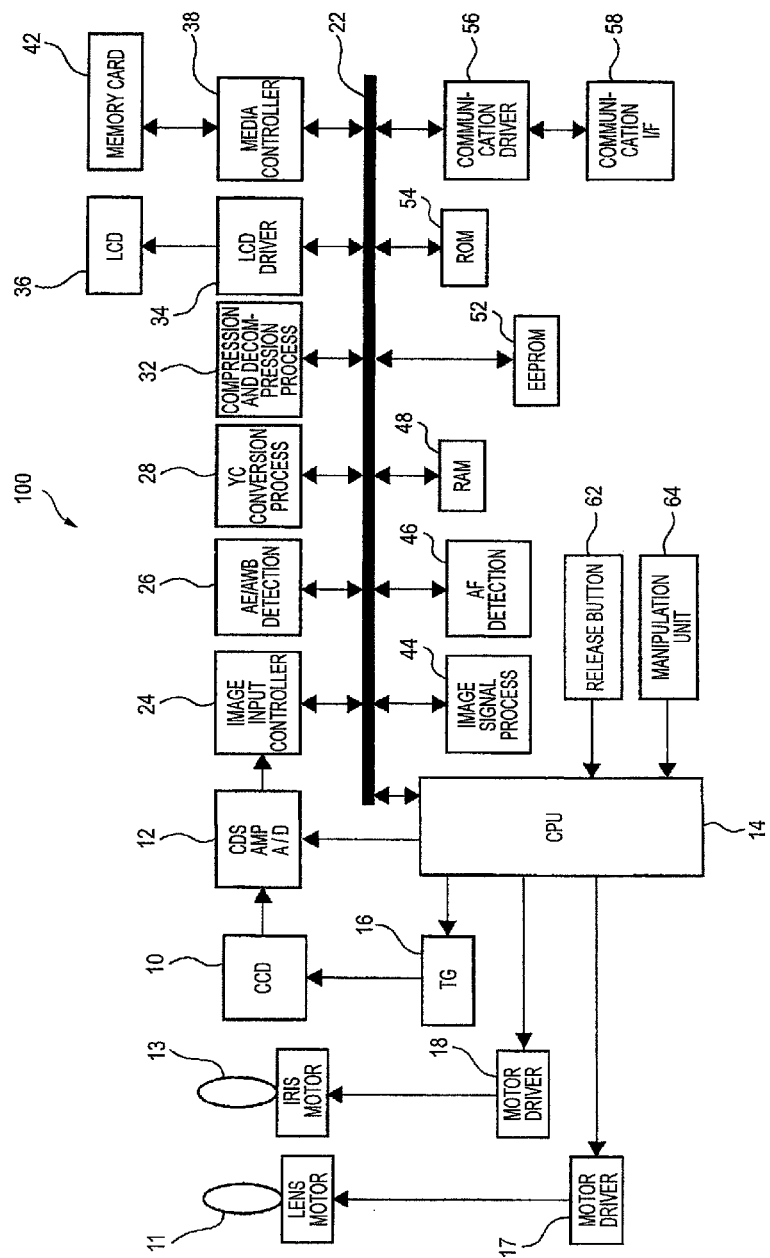
FIG. 1 is a diagram illustrating the configuration of an image pickup apparatus according to an embodiment of the invention.

FIG. 1 is a diagram illustrating the configuration of an image pickup device according to an embodiment of the invention. An image pickup apparatus 100 according to this embodiment will be described with reference to, for example, the configuration of a digital camera. An image selecting device according to this embodiment is also applied to the image pickup apparatus. This embodiment hereinafter will be described with reference to the configuration of the image pickup apparatus.

The image pickup apparatus 100 is configured to obtain an image in a manner that an imaging element receives light coming from a photographic subject and signal charges are generated by photoelectric conversion. In this embodiment, a CCD-type image sensor is used as an imaging element 10. However, a CMOS-type image sensor may be used as the imaging element 10.

The image pickup apparatus 100 includes a lens 11 that condenses the received light onto the imaging element 10, and an aperture diaphragm 13 that adjusts an amount of light incident from the lens 11 to the imaging element 10. The signal charges generated by the imaging element 10 are output to an analog front end 12. The analog front end 12 is provided with a CDS, an amplifier, an analog/digital converter, and the like. In the analog front end 12, analog signal charges are converted into digital signals, and a digital process is performed for the digital signals. The digital image processed by the analog front end 12 is output to an image input controller 24.

The image pickup apparatus 100 also includes a CPU 14. The CPU 14 controls the signal process of the analog front end 12 and controls a timing generator (TG) 16 that outputs a transfer pulse to control transfer of the signal charges of the imaging element 10. The CPU 14 controls a motor driver 17 that drives a lens motor for controlling a position of the lens 11. The CPU 14 also controls a motor driver 18 that drives an iris motor for adjusting an aperture of the aperture diaphragm 13.

The CPU 14 is connected a bus 22. The CPU 14 inputs/outputs signals to/from processing units (which will be described later) through the bus 22. The bus 22 is connected to an image input controller 24; an AE/AWB detecting unit 26 that detects exposure and white balance; a YC conversion processing unit 28 that converts RGB images into YC images; a compression and decompression processing unit 32 that compresses and decompresses images; an LCD driver 34 that controls a display unit 36 such as an LCD capable of displaying captured images; and a media controller 38 that writes/reads image information to/from a memory card 42 as an external recording medium. The bus 22 is connected to an image signal processing unit 44; an AF detecting unit 46; an RAM 48; an EEPROM 52; an ROM 54; a communication driver 56 that controls a communication interface 58 for communicating external devices.

The CPU 14 is connected to a release button 62 for instructing execution of capturing an image and a manipulation unit 64 for performing other predetermined instructions.

The image pickup apparatus 100 may record the captured images into the memory card 42. As necessary, a user may browse the stored images through the display unit 36 serving as an image display unit. The user may set to delete a desired image of the stored images with reference to the images displayed on the display unit 36. Also, the user may set to protect a desired image so as not to delete the desired image, with reference to the images displayed on the display unit 36. In this embodiment, the memory card 42 serves as a storage unit for recording the captured images. However, the storage unit is not limited thereto, but may be one provided in the image pickup apparatus 100.

The image pickup apparatus 100 according to this embodiment includes an image extracting unit and an album setting unit. The image extracting unit sets an image, of a plurality of captured images, showing the largest number of face images as a group photograph and extracts images including each of the face images of the group photograph from the plurality of captured images. The album setting unit records image identification information of the extracted images in a predetermined file. For example, the CPU 14 may serve as the image extracting unit and the album setting unit.

Next, a procedure of creating an album of a desired person from the plurality of images will be described.

Figure 2:
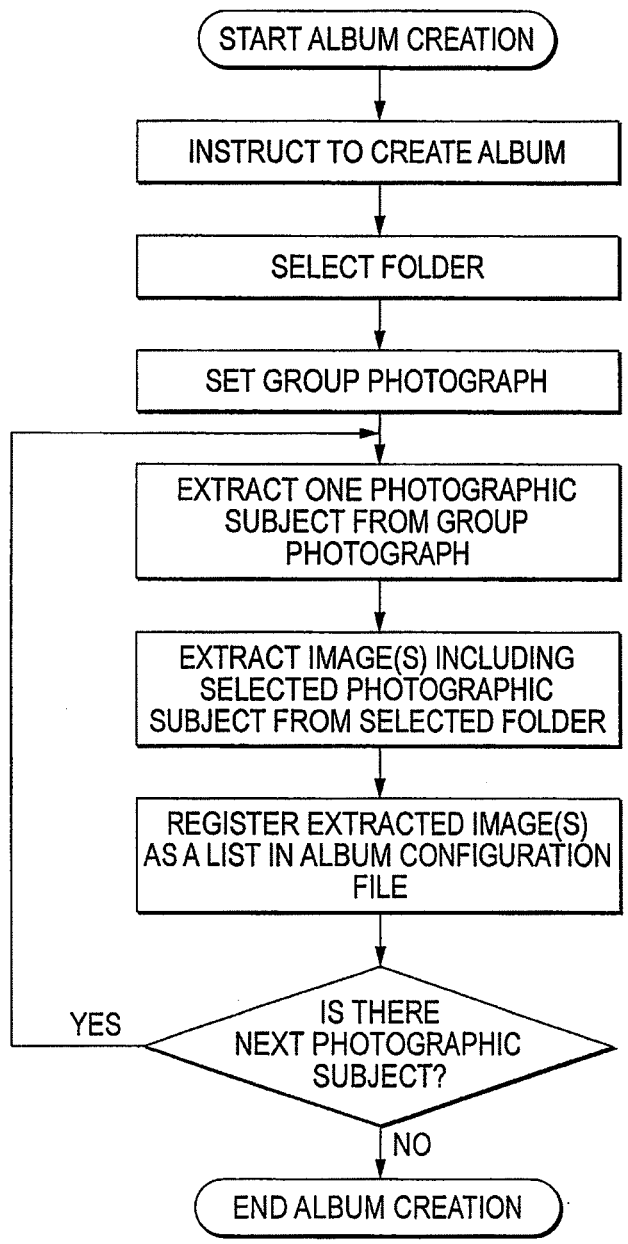
FIG. 2 is a flowchart illustrating a procedure of creating an album.
Figure 3:
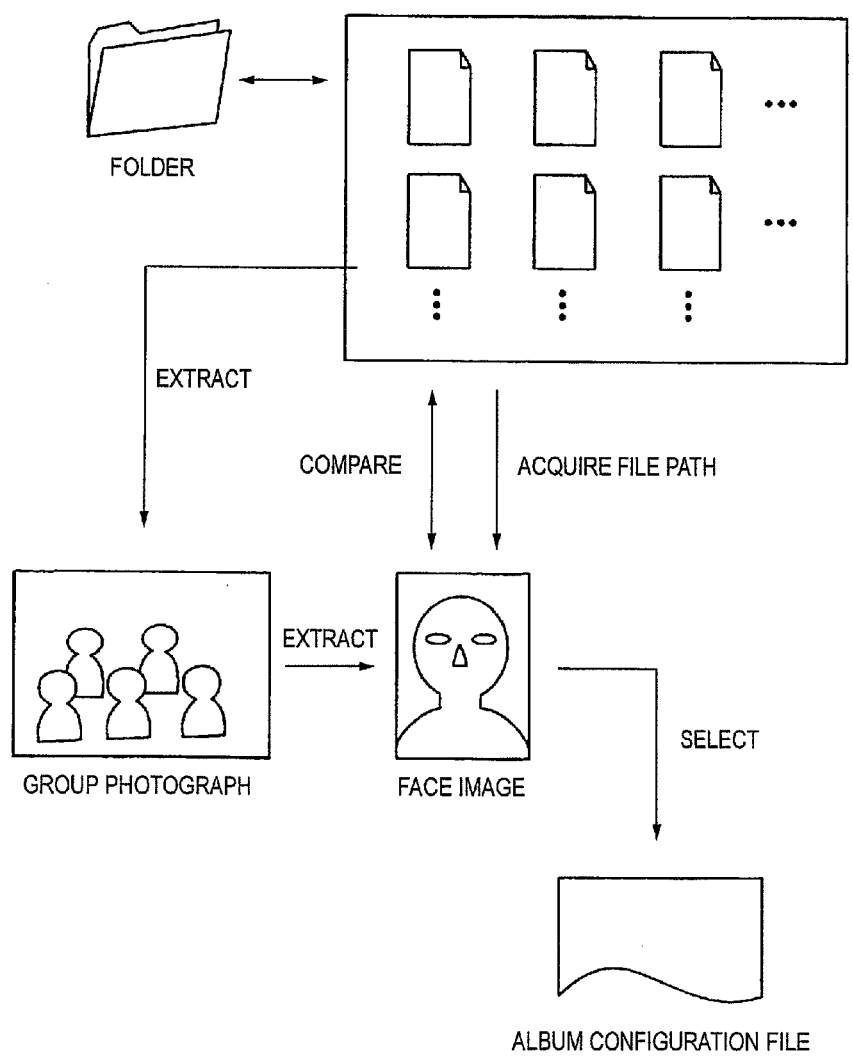
FIG. 3 is a diagram illustrating a procedure of creating an album.

FIG. 2 is a flowchart illustrating a procedure of creating an album. FIG. 3 is a diagram illustrating a procedure of creating an album.

First, a user inputs a command to create an album by manipulating a manipulation unit 64 or the like. After the creation of the album is instructed, a folder storing a plurality of images is selected. The selected folder may be displayed on the display unit (e.g., LCD 36).

After the folder is selected, a predetermined image is extracted from the plurality of images included in the selected folder and set as a group photograph. In extracting the group photograph, the known face recognition technique may be used to detect person face from all captured images stored in the selected folder. Then, of the plurality of captured image stored in the selected folder, an image showing the largest number of face images, for example, that face forward is extracted and set as the group photograph.

Next, one face image of photographic subjects in the set group photograph is extracted. The extracted face image is compared with the plurality of images stored in the selected folder, and image(s) including the extracted face image is (are) selected from the plurality of images.

File path(s) of the image(s) selected from the plurality of images is (are) recorded in an album configuration file as a list of the image(s) of the photographic subject corresponding to the extracted face image.

FIG. 4 is a diagram illustrating an example of the album configuration file. In the album configuration file, recorded are "group photograph file name," "the number of included face images," "face coordinate," "the number of associated images" and "file path of the associated images." "Face coordinate" indicates a position of each face image in the group photograph. "File paths of the associated images" indicates file paths that are acquired for the respective associated images. It should be noted that the items recorded in the album configuration file are not limited to this example. For example, predetermined image identification information may be used as a file path of an image so long as it can specify the image.

When a plurality of face images are extracted from the group photograph, information for each face image is recorded in the album configuration file by repeatedly executing the above-mentioned procedure. When the album setting information relating to all the extracted face images are stored, the creation of the album ends.

The image pickup apparatus and the image selecting device according to this embodiment include a list display unit. When one of face images is selected from a group photograph; the list display unit displays a list of images, other than the group photograph, including the selected face image with reference to file path(s) recorded in the album configuration file. The CPU 14, the LCD driver 34 and the LCD 36 may serve as the list display unit.

Figure 5:
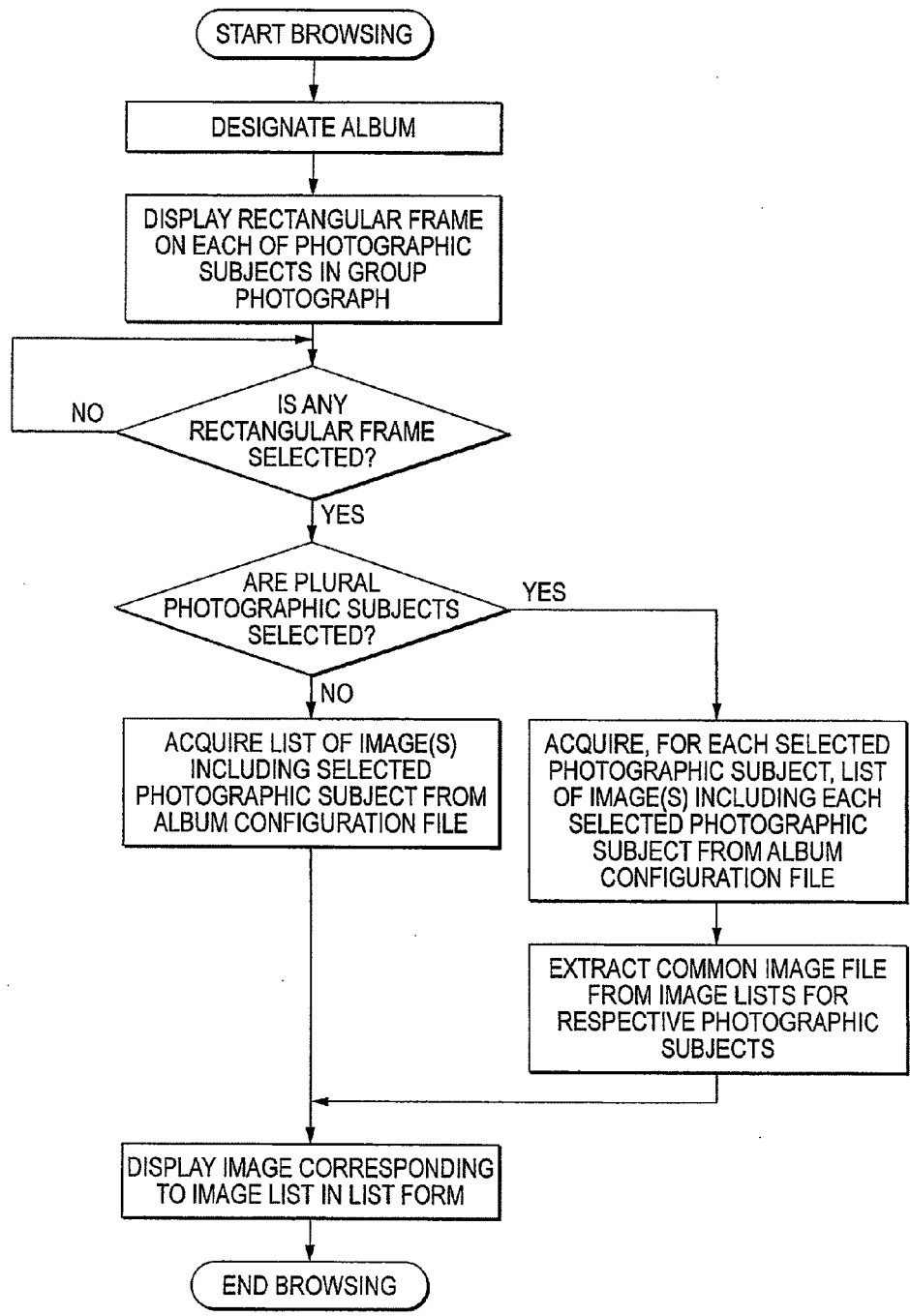
FIG. 5 is a flowchart illustrating a procedure of selecting a face image of a group photograph and browsing the selected image.

FIG. 5 is a flowchart illustrating a procedure of browsing an image by selecting one face image from a group photograph.

First, a user designates an album that he/she wants to browse. Then, a group photograph is displayed on the display unit (e.g., the LCD 36). In this case, face images of the group photograph are visually displayed with being surrounded by rectangular face-image frames. While confirming photographic subjects displayed on the display unit, the user selects and designates a face-image frame of a face image of a photographic subject that he/she wants to browse in a list manner. In this case, a user may select one or more face-image frames.

Figure 6:
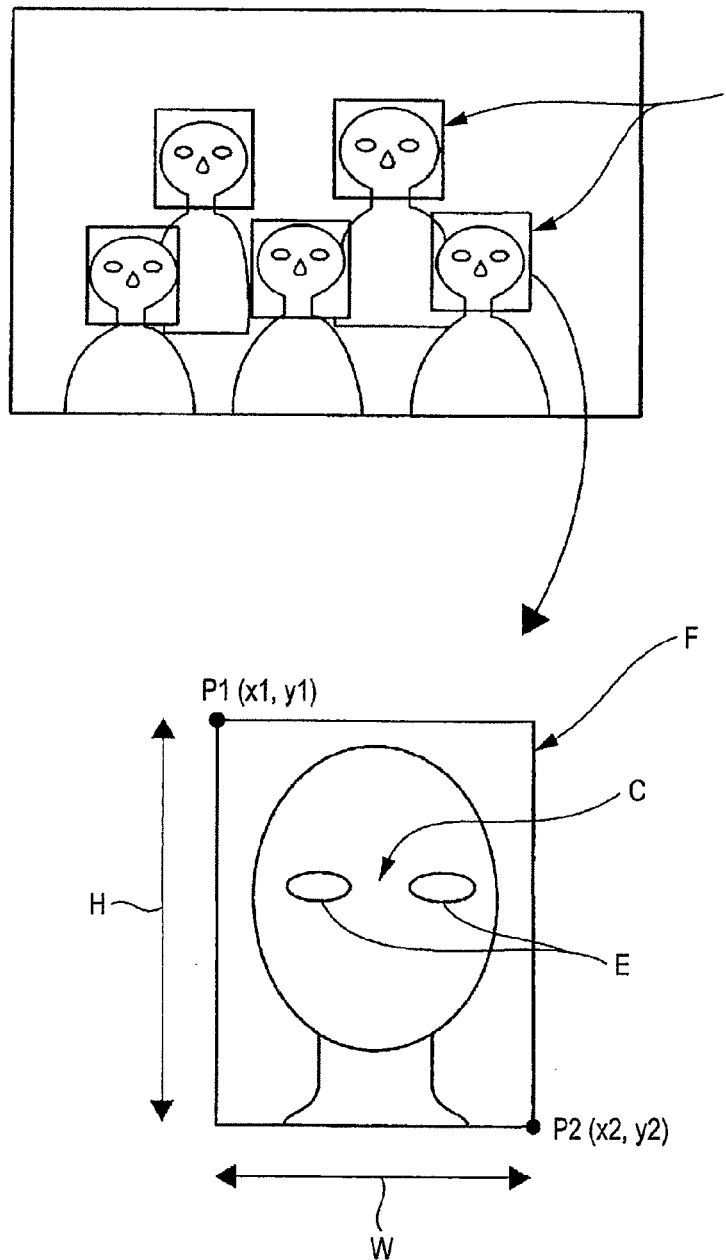
FIG. 6 is a diagram illustrating a group photograph and face images.

FIG. 6 is a diagram illustrating the group photograph and the face images. As shown in FIG. 6, rectangular face-image frames F that surround face areas of photograph subjects shown in the group photograph are displayed. In this example, each of the face-image frames F is set in the following manner.

(1) Positions of two eyes E are detected from each face image.

(2) A coordinate C of the center between the two eyes E is calculated, and the coordinate C is set as a central coordinate of each face-image frame F.

(3) A width W of each face-image frame F is set to be twice as large as a distance between the two eyes E, and a height H of the face-image frame F is set to be three times as large as the distance between the two eyes E.

A position of each face-image frame F in the group photograph may be set based on coordinate information. In this embodiment, the coordinate information is set based on a upper left point $P_1(x_1, y_1)$ and a lower right point $P_2(x_2, y_2)$ of each face-image frame F. However, the coordinate information for setting the position of each face-image frame F is not limited thereto, but may be arbitrarily set so long as it can specify the position of each face-image frame F in the group photograph.

When the user selects one face image, images including the same photographic subject are acquired with reference to the images associated with only the selected face image. Alternatively, when the user selects a plurality of face images, it is judged that the user requests to select images showing the plurality of selected face images together. Then, images associated with each selected face image are referenced for each selected face image based on the album configuration file, and images common to the images associated with the respective face images are extracted. Thereby, the images that simultaneously include the plural selected face images are acquired. Then, a list of the acquired images is displayed on the display unit.

As described in this embodiment, when a face image is selected from a group photograph, a list of images, other than the group photograph, including the selected face image is displayed. With this configuration, the images other than the group photograph are easily browsed in handling the images, which is convenient.

The image pickup apparatus according to this embodiment includes a number display unit and an edit unit. The number display unit displays a number of images including each face image of a group photograph. The edit unit changes the numbers of images. The image extracting unit extracts images including each face image from a plurality of images up to the number which correspond to each face image and which is designated by the edit unit, based on recommendation degrees of the plurality of images. The CPU 14, the LCD driver 34 and the LCD 36 may serve as the number display unit and the edit unit.

The recommendation is an index indicating that characteristics of the image are good. The characteristics of the image are numerical values corresponding to technical items of image data. The recommendation degree is an "estimation value" obtained by integrating the characteristics. For example, when Ei denotes a numerical value of an i-th technical item of a certain image, "estimation value" P of the image is calculated by the following expression:

$$P=\Sigma WiEi \qquad (1)$$

The numerical value P and the numerical values Ei for respective items are analysis results of the image. Wi denotes a weight for the i-th technical item. Wi is set as parameters in advance, for example, in such a manner that i=1 indicates "image stabilization," and i=2 indicates "exposure." The manner of calculating the estimation value is not limited to this example. Also, an evaluation value disclosed in JP 2006-172097 A (corresponding to US 2006/0126124 A) that was filed by (assigned to) Fujifilm Corporation may be used in this embodiment as the evaluation value. The entire contents of JP 2006-172097 A and US 2006/0126124 A are incorporated herein by reference.

The recommendation degree of an image may include a significance degree of the image indicating how significantly a user handles the image. Generally, when a plurality of images are classified into a plurality of categories, many users would recognize that a category having a larger number of classified images are more significant. In hierarchized and classified categories, as the number of images included in a higher level of a certain category is larger, many users would recognize that the category is more significant. In the hierarchized and classified categories, as the number of categories which are included in the same level and have a common next-high level is larger, many users would recognize that the categories are significant. In the hierarchized and classified categories, as the level is deeper (i.e., a category has the large number of lower levels), many user would recognize that the category is more significant. In the hierarchized and classified categories, as the number of levels from the highest level to a category is larger, many users would recognize that the category is more significant. In consideration of these facts, the significance degree of each of categories that are classified in advance may be set based on at least one information among (i) the number of images included in each category, (ii) the number of images included in categories of higher levels than each category, (iii) the number of categories relating to each category, (iv) the number of lower levels of each category, and (v) the number of levels from the highest class to each category. Criteria for setting the significance degrees of the images are not limited to this example. For example, significance degrees described in JP 2006-172090 A (corresponding to US 2006/0126124 A) may be used in this embodiment as the significance degrees.

Figure 7:
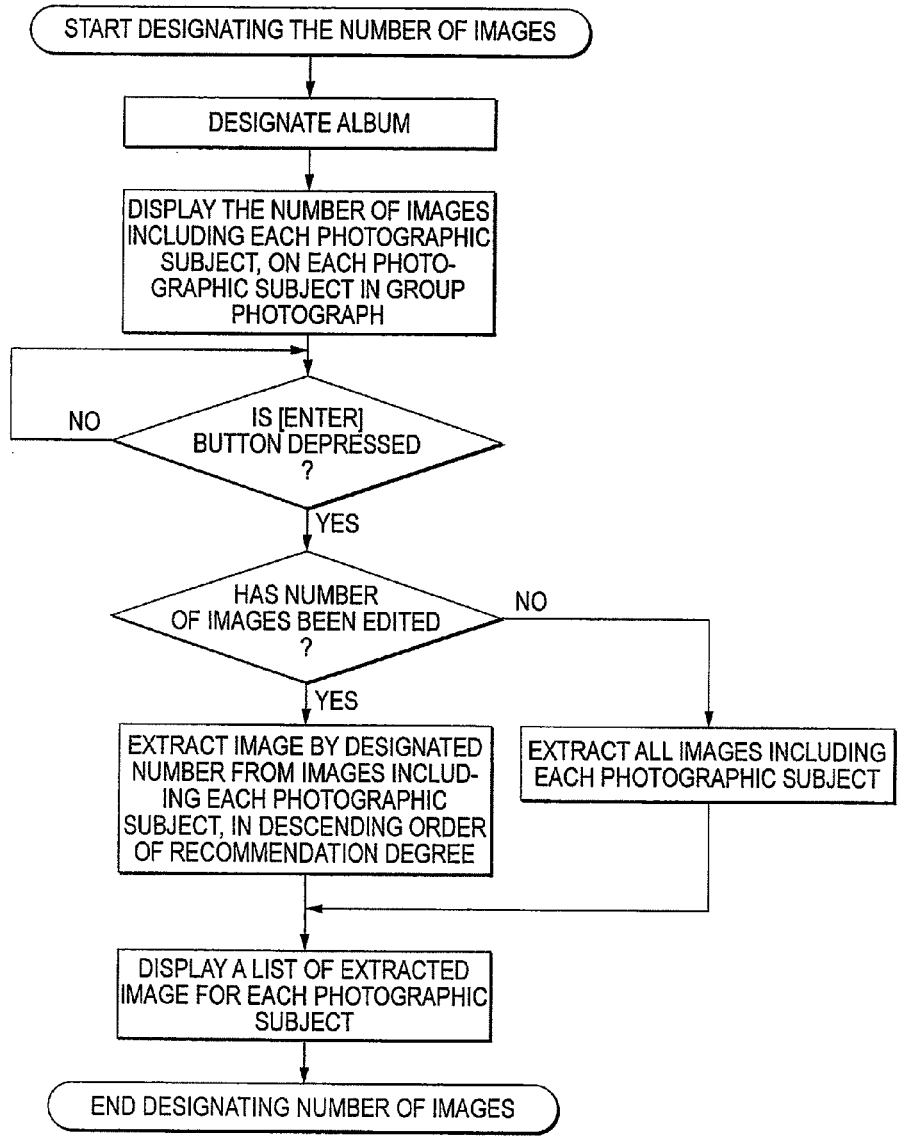
FIG. 7 is a flowchart illustrating a procedure of displaying the number of images when the images of an album configuration file are browsed.

FIG. 7 is a flowchart illustrating a procedure of displaying the number of images including each face image when the images of the album configuration file are browsed. FIG. 8 is a diagram illustrating a state where the number of images is displayed.

First, a user designates an album that he/she wants to browse. For each face image shown in the group photograph, displayed is the number of images that indicates how many images are there which are other than each face image and which include each face image, together with each face image.

Numeral "6" of a reference symbol n0 shown in FIG. 8 indicates that there are six images including a face image shown in the group photograph. The numeral "6" is displayed at the lower right portion of the face image. The position for displaying the numeral indicating the number of images is not limited to this example.

The user can confirm the number of images corresponding to a desired photographic subject by seeing the group photograph displayed on the display unit. If necessary, the user may edit to reduce the number of images. After the edit ends, the user depresses an "ENTER" button.

Then, it is judged as to whether or not the number of images corresponding to the face image has been edited. If it is judged that the number of images has been edited, the images including the face image of the photographic subject are extracted by the designated number of images, in descending order of recommendation degree (i.e., extracted from a better-captured image). A list of the extracted images is displayed on the display unit. Numeral "3" of a reference symbol n1 shown in FIG. 8 indicates that, the user edits and requests to extract three images including the face image of the photographic subject. The numeral "3" is displayed at the lower right portion of the face image. The position for displaying the numeral indicating the number of images is not limited to this example. In The number of images, which are extracted based on recommendation degrees of images, may not be the number designated by the user, but may be the number of images that have recommendation degrees larger than a predetermined threshold value of a recommendation degree.

Alternately, when the number of images has not been edited, all images including the face image are extracted. Then, a list of the extracted images is displayed on the display unit.

With this configuration, the number of images, which includes each face image, is displayed for each face image of the group photograph and the number of images is changeable to the predetermined number of images based on the recommendation degrees. Therefore, it is possible to reduce burden in selecting images when the printed images are reprinted and distributed.

An image selecting method according to this embodiment may be appropriately implemented using the image pickup apparatus and the image selecting device. That is, the image selecting method includes: setting a predetermined image of a plurality of images as a group photograph; extracts, from the plurality of images, images including each of face images of the group photograph; and recording image identification information of the extracted images in a predetermined file.

This embodiment may be implemented by a program used in the image selecting device or the image pickup apparatus. That is, the program causes a computer to execute image selection including: setting a predetermined image of a plurality of images as a group photograph; extracts, from the plurality of images, images including each of face images of the group photograph; and recording image identification information of the extracted images in a predetermined file. Also, this embodiment may be implemented by a computer-readable medium storing this program.

With this embodiment, a group photograph is extracted from a plurality of captured images, and each face image of the group photograph is stored in a file together with image identification information of other images. Accordingly, when an album for each person who is a photographic subject is created, it is possible to promptly acquire information that associates each person who is the photographic subject with the other images showing each person. Therefore, the user does not need to select images by himself (herself) and it is possible to automatically obtain an index of the album for each image, which is convenient for use.

What is claimed is:

1. An image selecting device comprising:
    a computer processor configured to perform the functions of a setting unit, a face detecting unit, an image extracting unit, an album setting unit and a number display unit;
    said setting unit that sets a single image from amongst a plurality of images and respective stored image identification information as a group photograph determined by facial recognition to have faces;
    said face detect unit that detects a face image indicating a face of a specific person from the group photograph and identifies the specific person from the detected face image;
    said image extracting unit that extracts one or more images each of which includes the specific person detected by the face detect unit and indicating the face of the identified specific person from among the one or more of images; and
    said album setting unit that records said respective stored image identification information of the one or more images extracted by the image extracting unit in a predetermined file when said image extracting unit extracts said one or more images;
    said number display unit that displays a numeral together with each of the one or more images extracted by the image extracting unit; and
    an edit unit that edits the displayed numeral,
    wherein the image extracting unit extracts the one or more images up to the number edited by the edit unit, based on a recommendation of each of the one or more images.

2. The image selecting device according to claim 1, further comprising a list display unit that displays a list of the one or more images extracted by the image extracting unit when the specific person detected by the face detect unit is selected.

3. The image selecting device according to claim 1, wherein the setting unit sets an image, from among the plurality of images, showing the largest number of face images that face front as the group photograph.

4. The image selecting device according to claim 1, wherein the image identification information includes image storage position information that specifies storage position of the one or more images extracted by the extracting unit.

5. The image selecting device according to claim 1, wherein when the specific person is detected From the group photograph, a face-image frame having a rectangular shape surrounding the face of the specific person is set based on coordinate information.

6. An image selecting method comprising:
sensing by a processor a single image from amongst a plurality of images and respective stored image identification information as a group photograph determined by facial recognition to have faces;
detecting by the processor a face image indicating a face of a specific person from the group photograph;
identifying by the processor the specific person from the detected face image;
extracting by the processor one or more images each of which includes the specific person and indicating the face of the identified specific person from among the one or more images; and
recording by the processor said respective stored image identification information of the extracted one or more images in a predetermined file when said one or more images is extracted;
displaying a numeral together with each of the one or more images extracted; and
editing the displayed numeral,
wherein one or more images up to the number edited is extracted based on a recommendation of each of the one or more images.

7. The image selecting method according to claim 6, further comprising displaying a list of the extracted one or more images when the detected specific person image is selected.

8. The image selecting method according to claim 6, wherein an image, from among the plurality of images, showing the largest number of face images that face front is set as the group photograph.

9. The image selecting method according to claim 6, wherein the image identification information includes image storage position information that specifies storage position of the extracted one or more images.

10. The image selecting method according to claim 6, wherein when the specific person is detected from the group photograph, a face-image frame having a rectangular shape surrounding the face of the specific person is set based on coordinate information.

11. An image pickup apparatus comprising:
a setting device that sets a single image from amongst a plurality of images and respective stored image identification information as a group photograph determined by facial recognition to have faces;
a face detect device that detects a face image indicating a lace of a specific person from the group photograph and identities the specific person from the detected face image;
an image extracting device that extracts one or more images each of which includes the specific person detected by the face detect device and indicating the face of the identified specific person from among the one or more images; and
an album setting device that records said respective stored image identification information of the one or more images extracted by the image extracting device in a predetermined file when said image extracting device extracts said one or more images,
a number display device that displays a numeral together with each of the one or more images extracted by the image extracting device; and
an edit device that edits the displayed numeral,
wherein the image extracting device extracts the one or more images up to the number edited by the edit device, based on a recommendation of each of the one or more images.

12. The image pickup apparatus according to claim 11, further comprising:
a list display device that displays a list of the one or more images extracted by the image extracting device when the specific person detected by the face detect device is selected.

13. The image pickup apparatus according to claim 11, wherein the setting device sets an image, from among the plurality of images, showing the largest number of face images that face front as the group photograph.

14. The image pickup apparatus according to claim 11, wherein the image identification information includes image storage position information that specifies the storage position of the one or more images extracted by the extracting unit.

15. The image pickup apparatus claim 11, wherein when the specific person is detected from the group photograph, face-image frame having a rectangular shape surrounding the face of the specific person is set based on coordinate information.

16. A non-transitory computer-readable medium storing a program that causes a computer to execute image selecting method, the image selecting method comprising:
setting a single image from amongst a plurality of images and respective stored image identification information as a group photograph determined by facial recognition to have faces;
detecting a face image indicating a face of a specific person from the group photograph;
identifying the specific person from the detected face image;
extracting one or more images each of which includes the specific person and indicating the face of the identified specific person from among the one or more of images; and
recording said respective stored image identification information of the extracted one or more images in a predetermined file when said one or more images is extracted;
displaying a numeral together with each of the one or more images extracted; and
editing the displayed numeral,
editing the displayed numeral or symbol or digit,
wherein one or more images up to the number edited is extracted based on a recommendation of each of the one or more images.

17. The non-transitory computer-readable medium according to claim 16, wherein the image selecting method further comprises displaying a list of the extracted one or more images when the detected specific person is selected.

18. The non-transitory computer-readable medium according to claim 16, wherein an image, from among the plurality of images, showing the largest number of face images that face front is set as the group photograph.

19. The non-transitory computer-readable medium according to claim 16, wherein the image identification information includes image storage position information that specifies storage position of the extracted one or more images.

20. The non-transitory computer-readable medium according to claim 16, wherein when the specific person is detected from the group photograph, a face-image frame having a rectangular shape surrounding the face of the specific person is set based on coordinate information.

21. An image selecting device comprising:
a storage device that stores a plurality of images and image identification information of the plurality of images;
an album setting device that selects a single image from amongst the plurality of images and respective stored image identification information as a group photograph determined by facial recognition to have faces, detects a lace image indicating a face of a specific person from the one of the plurality of images, identifies the specific person from the detected face image, extracts one or more images each of which includes the specific person and indicating the face of the identified specific person from among the one or more of images, and records said respective stored image identification information of the extracted one or more images in an album setting file when said one or more images is extracted,
a number display device that displays a numeral together with each of the one or more images extracted by the album setting device; and
an edit device that edits the displayed numeral,
wherein the album setting device extracts the one or more images up to the number edited by the edit device, based on a recommendation of each of the one or more images.

* * * * *